(12) United States Patent
Xue

(10) Patent No.: US 9,736,439 B2
(45) Date of Patent: Aug. 15, 2017

(54) LASER DIODE VOLTAGE SOURCE CONTROLLED BY VIDEO LOOK-AHEAD

(71) Applicant: Microvision, Inc., Redmond, WA (US)

(72) Inventor: Bin Xue, Mukilteo, WA (US)

(73) Assignee: Microvision, Inc., Redmond, WA (US)

( * ) Notice: Subject to any disclaimer, the term of this patent is extended or adjusted under 35 U.S.C. 154(b) by 236 days.

(21) Appl. No.: 14/481,563

(22) Filed: Sep. 9, 2014

(65) Prior Publication Data

US 2016/0073069 A1 Mar. 10, 2016

(51) Int. Cl.
*H04N 9/31* (2006.01)
*G06F 1/32* (2006.01)

(52) U.S. Cl.
CPC ......... *H04N 9/3135* (2013.01); *G06F 1/3203* (2013.01); *H04N 9/3129* (2013.01); *H04N 9/3173* (2013.01)

(58) Field of Classification Search
None
See application file for complete search history.

(56) References Cited

U.S. PATENT DOCUMENTS

| | | | | | |
|---|---|---|---|---|---|
| 5,237,161 | A | * | 8/1993 | Grodevant | G06K 7/10881 235/462.31 |
| 5,260,554 | A | * | 11/1993 | Grodevant | G06K 7/10584 235/462.31 |
| 6,445,362 | B1 | * | 9/2002 | Tegreene | G02B 26/0841 345/4 |
| 7,711,018 | B2 | * | 5/2010 | Champion | H01S 5/0683 372/29.011 |
| 8,605,764 | B1 | * | 12/2013 | Rothaar | G02B 27/01 372/29.01 |
| 2002/0027456 | A1 | * | 3/2002 | Barrow | H03K 17/08122 327/110 |
| 2002/0180869 | A1 | | 12/2002 | Callison et al. | |
| 2004/0119004 | A1 | | 6/2004 | Wine et al. | |
| 2005/0264472 | A1 | * | 12/2005 | Rast | G09G 3/14 345/30 |
| 2008/0048979 | A1 | | 2/2008 | Ruttenberg | |
| 2008/0106493 | A1 | * | 5/2008 | Lach | G09G 3/02 345/46 |
| 2009/0028199 | A1 | * | 1/2009 | Brown | H04N 9/3129 372/38.01 |
| 2009/0034999 | A1 | * | 2/2009 | Komiya | G03G 15/326 399/51 |
| 2009/0274185 | A1 | * | 11/2009 | Champion | H01S 5/042 372/38.02 |
| 2010/0182668 | A1 | | 7/2010 | Abe et al. | |
| 2011/0080533 | A1 | * | 4/2011 | Champion | H04N 9/3129 348/744 |

(Continued)

OTHER PUBLICATIONS

Microvision, Inc., , "International Search Report and Written Opinion", PCT/US2015/047685.

*Primary Examiner* — Mohammad J Rahman
(74) *Attorney, Agent, or Firm* — Kevin D. Wills

(57) ABSTRACT

A scanning projector includes a programmable voltage source to provide a programmable voltage to a laser light source. A look-ahead circuit determines future voltage requirements by finding peaks in future pixel data. The programmable voltage may change for each frame of video, for each line of video, or multiple times within each line of video.

12 Claims, 10 Drawing Sheets

(56) References Cited

U.S. PATENT DOCUMENTS

| | | | |
|---|---|---|---|
| 2011/0205498 A1* | 8/2011 | Brown | G09G 3/02 353/31 |
| 2013/0003026 A1* | 1/2013 | Rothaar | G03B 21/2033 353/85 |
| 2013/0050156 A1* | 2/2013 | Rothaar | G02B 26/101 345/204 |
| 2013/0070796 A1* | 3/2013 | Belloni | H05B 33/0815 372/38.01 |
| 2016/0073071 A1* | 3/2016 | Nagashima | G02B 27/0101 353/121 |

* cited by examiner

LASER DIODE VOLTAGE SOURCE CONTROLLED BY VIDEO LOOK-AHEAD

FIELD

The present invention relates generally to projection systems, and more specifically to projection systems utilizing laser light sources.

BACKGROUND

Scanning laser projectors typically scan a modulated laser beam in a raster pattern to display an image. Laser light sources and the associated drive circuits used to produce the modulated laser beam typically consume a significant percentage of all power consumed by the scanning laser projector. Reducing power consumption is desirable for many reasons, including providing for increased battery life in handheld devices.

DETAILED DESCRIPTION

Figure 1:
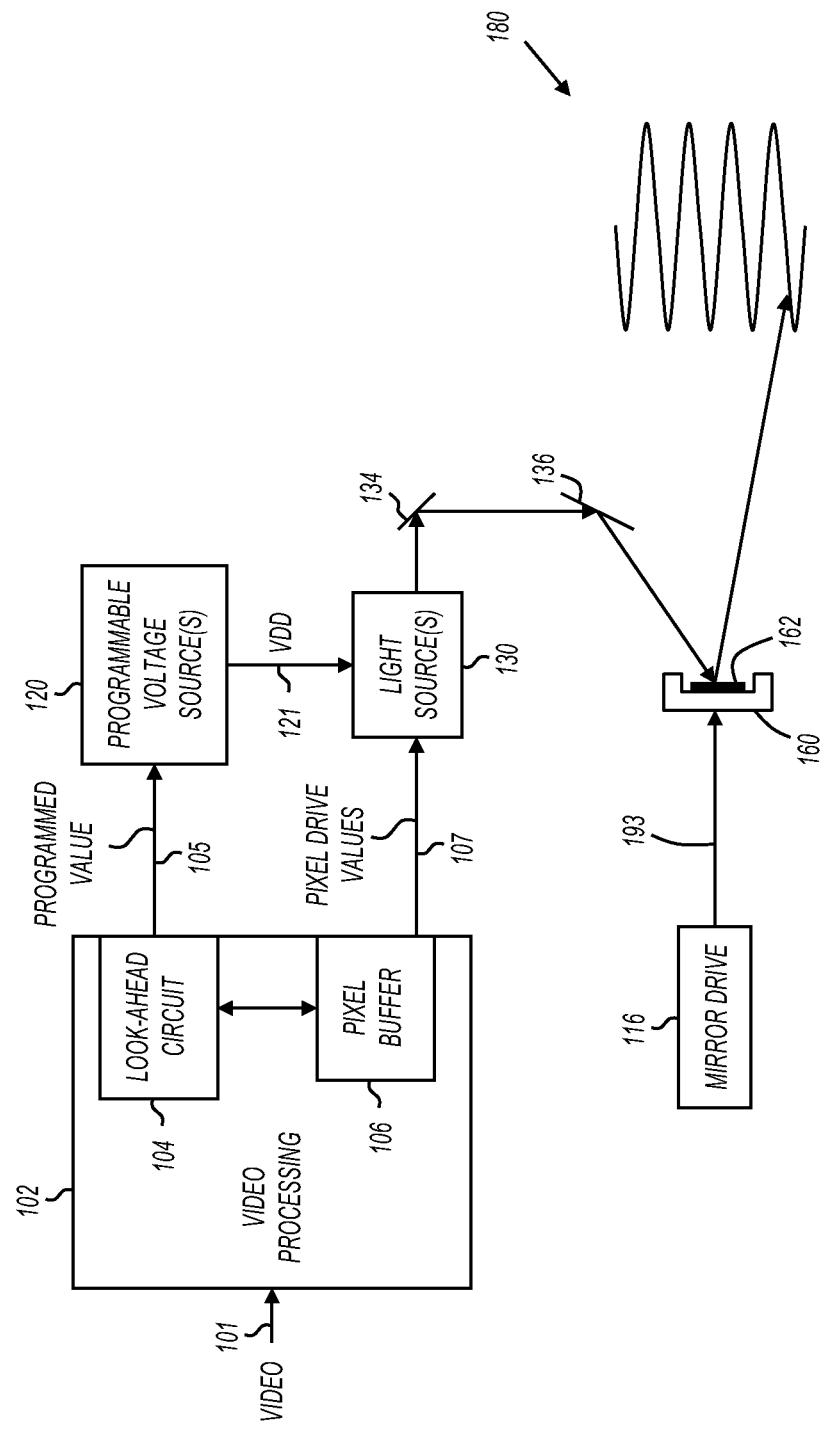
FIG. 1 shows a scanning laser projector in accordance with various embodiments of the present invention.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning laser projector in accordance with various embodiments of the present invention. Scanning laser projector 100 includes video processing component 102, programmable voltage source(s) 120, light source(s) 130, micro-electronic machine (MEMS) device 160 having scanning mirror 162, and mirror drive circuits 116. Scanning laser projector 100 also includes guiding optics 134 and 136.

In operation, video processing component 102 receives video data on node 101 and produces pixel drive values on node 107 used to drive light source(s) 130 when pixels are to be displayed. The video data on node 101 represents image source data that is typically received with pixel data on a rectilinear grid, but this is not essential. For example, video data on node 101 may represent a grid of pixels at any resolution (e.g., 640×480, 848×480, 1920×1080). Scanning laser projector 100 is a scanning projector that scans a raster pattern shown at 180. The raster pattern does not necessarily align with the rectilinear grid in the image source data, and video processing component 102 operates to produce display pixel data that will be displayed at appropriate points on the raster pattern. For example, in some embodiments, video processing component 102 interpolates vertically and/or horizontally between pixels in the source image data to determine display pixel values along the scan trajectory of the raster pattern.

Light source(s) 130 receive the pixel drive values output from video processing component 102, and produce modulated light beam(s) having grayscale values in response thereto. Light source(s) 130 may be monochrome or may include multiple different color light sources. For example, in some embodiments, light source(s) 130 includes red, green, and blue light sources. In these embodiments, video processing component 102 outputs pixel drive values corresponding to each of the red, green, and blue light sources.

In some embodiments, light source(s) 130 may include one or more laser light producing devices. For example, in some embodiments, the light source(s) 130 may include laser diodes. In these embodiments, light source(s) 130 may also include driver circuits that accept and/or condition drive signals. For example, driver circuits may include digital-to-analog (D/A) converters, transimpedance amplifiers, coupling circuits, bias circuits, switches, and the like. Modulated light beam(s) from light source(s) 130 are directed to mirror 162 via guiding optics 134, 136. Any type of optical element may be included in the light path between light source(s) 130 and mirror 162. For example, scanning laser projector 100 may include collimating lenses, dichroic mirrors, or any other suitable optical elements.

Scanning mirror 162 is positioned to receive the modulated light beam(s) from light source(s) 130. In some embodiments, scanning mirror 162 is a sinusoidally scanning mirror that scans sinusoidally on at least one axis. Further, in some embodiments, scanning mirror 162 scans back and forth and has an instantaneous scan phase that sweeps through a zero phase value and positive and negative video extents phase values.

Scanning mirror 162 deflects on two axes in response to electrical stimuli received on node 193 from mirror drive circuits 116. While moving on the two axes, scanning mirror 162 reflects light provided by light source(s) 130. The reflected modulated light beams sweep a raster pattern and paint individual pixels as the light beams are modulated, resulting in an image display at 180. The shape of the raster pattern swept by scanning mirror 162 is a function of the mirror movement on its two axes.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one which deflects the beam along one axis, and another which deflects the beam along a second axis largely perpendicular to the first axis.

In some embodiments, MEMS device 160 and mirror drive circuits 116 operate with a closed feedback loop. For example, MEMs device 160 may include one or more sensors that produce a sync signal that provides information regarding mirror position. The sync signal may be a horizontal sync signal that transitions a known number of times per horizontal sweep of scanning mirror 162, or may be a vertical sync signal that transitions a known number of times per vertical sweep of scanning mirror 162. Mirror drive circuits 116 may receive the sync signal and adjust the drive signal on node 193 in response thereto. Mirror drive circuits 116 may also provide mirror position information to video processing component 102, and video processing component 102 may utilize this information to time the pixel drive values provided to light source(s) 130. The details of these feedback loops are omitted from FIG. 1.

Mirror drive circuits 116 may be implemented in any suitable fashion. For example, in some embodiments, mirror drive circuits 116 includes a phase lock loop circuit having a phase comparator, voltage controlled oscillator, frequency multipliers and/or dividers, and the like. The manner in which mirror drive circuits 116 are implemented is not a limitation of the presene invention.

Video processing component 102 includes pixel buffer 106 and look-ahead circuit 104. In operation, pixel buffer 106 stores pixel drive values that will be used to drive the light sources at some time in the future. For example, in some embodiments, pixel buffer 106 stores one or more video frames of pixels. In these embodiments, the contents of pixel buffer 106 represent pixels that will be displayed in future video frames. Also for example, in some embodiments, pixel buffer 106 stores one or more video lines of pixels. In these embodiments, the contents of pixel buffer 106 represents pixels that will be displayed in future lines of video.

In some embodiments, pixel buffer 106 is implemented with one or more digital memory devices. For example, a random access memory device may be used to hold one dimensional arrays of data or two dimensional arrays of data. Also for example, an array of registers may be used to implement pixel buffer 106. In some embodiments, pixel buffer 106 is implemented using a dual port memory device that may be accessed by multiple devices simultaneously.

Look-ahead circuit 104 "looks ahead" in time within pixel buffer 106 to determine maximum future pixel drive values (and associated maximum laser diode drive current values). Look-ahead circuit 104 then determines a suitable power supply voltage to supply to light sources 130 when displaying the future pixels. In some embodiments, look-ahead circuit 104 determines a minimum power supply voltage necessary for proper operation of light sources 130 when displaying the future pixels. In these embodiments, the minimum power supply voltage is equal to the needed laser diode junction voltage plus a headroom value to support operation of any driver circuitry.

Look-ahead circuit 104 provides the power supply voltage value as a "programmed value" to programmable voltage source(s) 120 on node 105. The programmed value may be a digital value used to command programmable voltage source(s), or may be an analog voltage value that programmable voltage source(s) are designed to match.

In operation, programmable voltage source(s) produce a power supply voltage VDD in response to the programmed value received on node 105. As explained further below, various embodiments of the present invention provide significant power savings by modifying the power supply voltage provided to the laser light sources in response to future video content.

Programmable voltage source 120 may be implemented in any suitable fashion without departing from the scope of the present invention. For example, programmable voltage source 120 may be an unregulated switching power supply.

Figure 2:
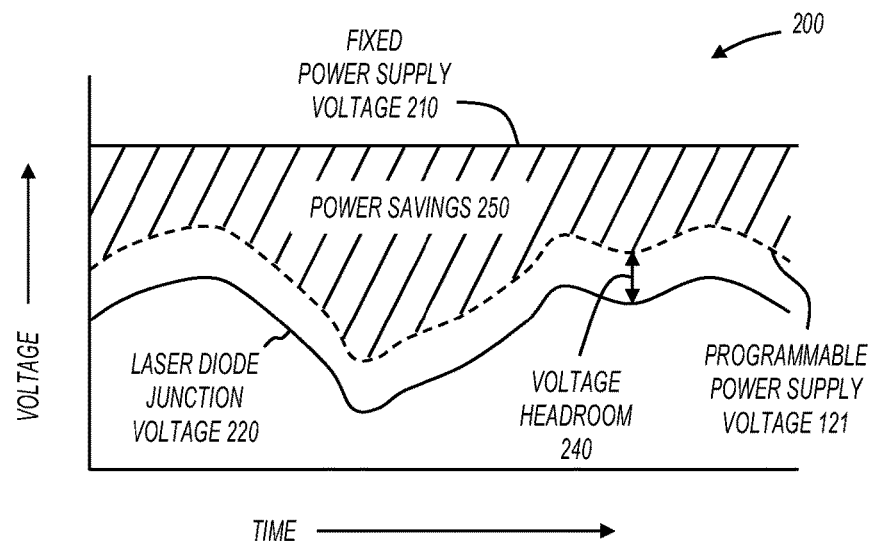
FIG. 2 shows a plot comparing a fixed power supply voltage to a programmable power supply voltage in accordance with various embodiments of the present invention.

FIG. 2 shows a plot comparing a fixed power supply voltage to a programmable power supply voltage in accordance with various embodiments of the present invention. Plot 200 shows a laser diode junction voltage 220 that results over time when a laser diode is driven with different currents. The drive currents correspond to pixel drive values over time. Voltage headroom 240 is a voltage value over and above the laser diode junction voltage that is required for proper operation of driver circuits.

Various embodiments of the present invention program power supply voltage 121 to be equal to the sum of the laser diode junction voltage 220 and the voltage headroom 240 rather than the fixed power supply voltage 210. When the laser light sources are powered using programmable power supply voltage 121 rather than fixed power supply voltage 210, a power savings 250 is achieved due to the difference in voltage drop across the light source. Power savings are quantified in examples described below.

Figures 3A, 3B, 3C:
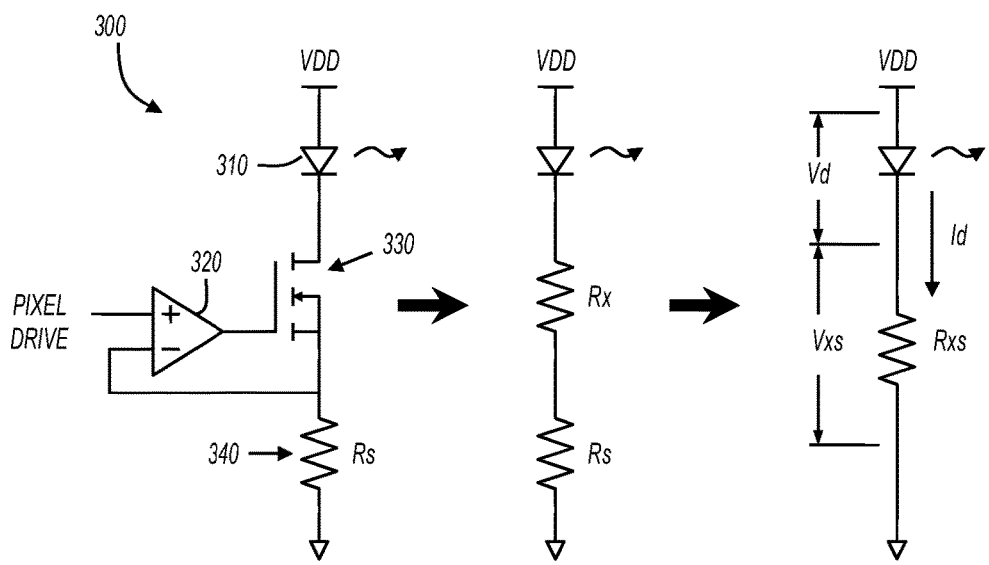
FIGS. 3A-3C show a laser light source and its simplified schematic in accordance with various embodiments of the present invention.

FIGS. 3A-3C show a laser light source and its simplified schematic in accordance with various embodiments of the present invention. Light source 300 is an example light source that may be used for light source 130 (FIG. 1). Referring to FIG. 3A, light source 300 includes amplifier 320, drive transistor 330, sensing resistor (Rs) 340, and laser diode 310. Amplifier 320, drive transistor 330, and sensing resistor 340 make up an analog current source. In operation, a pixel drive voltage is applied to the positive input of amplifier 320, which causes drive transistor to conduct a current Id equal to the pixel drive voltage divided by Rs.

FIG. 3B replaces drive transistor 330 with an equivalent resistance Rx, and FIG. 3C combines Rx and Rs with a combined equivalent resistance Rxs. When laser diode 310 is driven with current Id, a voltage Vd results across the laser diode. Vxs represents VDD-Vd, which is the voltage that must be dropped across Rxs. To the extent that Vxs is larger than necessary to support proper operation of drive transistor 330, power is wasted. Various embodiments of the present invention program VDD causing it to vary as a function of video content in order to save power. VDD as shown in FIG. 3 corresponds to programmable power supply voltage 121 (FIGS. 1, 2).

Figure 4:
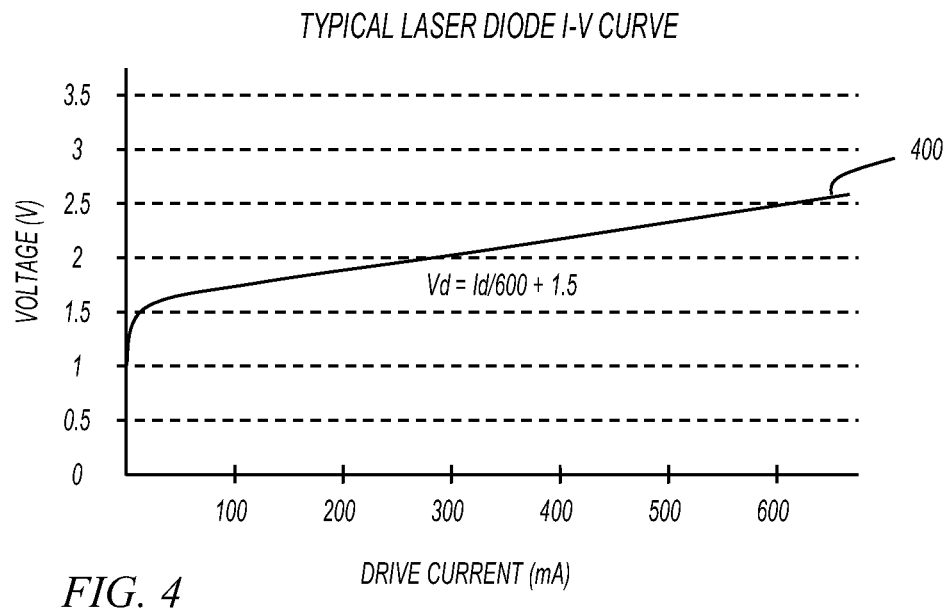
FIG. 4 shows a typical laser diode I-V curve in accordance with various embodiments of the present invention.

FIG. 4 shows a typical laser diode I-V curve in accordance with various embodiments of the present invention. Curve 400 is a characteristic curve for a hypothetical red laser diode, although many different diodes from various manufacturers will exhibit very similar characteristics. Laser diodes that emit colors of different wavelengths will also exhibit similar characteristics, although the voltage and current scales may be different. The sample curve 400 is illustrated for discussion purposes, and in no way is meant to limit the scope of the invention.

The remainder of this analysis assumes that curve 400 represents the characteristic of laser diode 310 (FIG. 3A). For a substantially linear curve, the laser diode junction voltage ($V_d$) can be approximated as:

$$V_d = k*I_d + V_O \quad (1)$$

where k is the slope and Vo is the y-intercept. In the example of FIG. 4, this becomes $$V_d = I_d/600 + 1.5 \quad (2)$$

It is important to note that the laser diode voltage is a function of the drive current and not the other away around. The voltage across the diode ($V_d$) varies over time as the drive current is varied.

Figure 5:
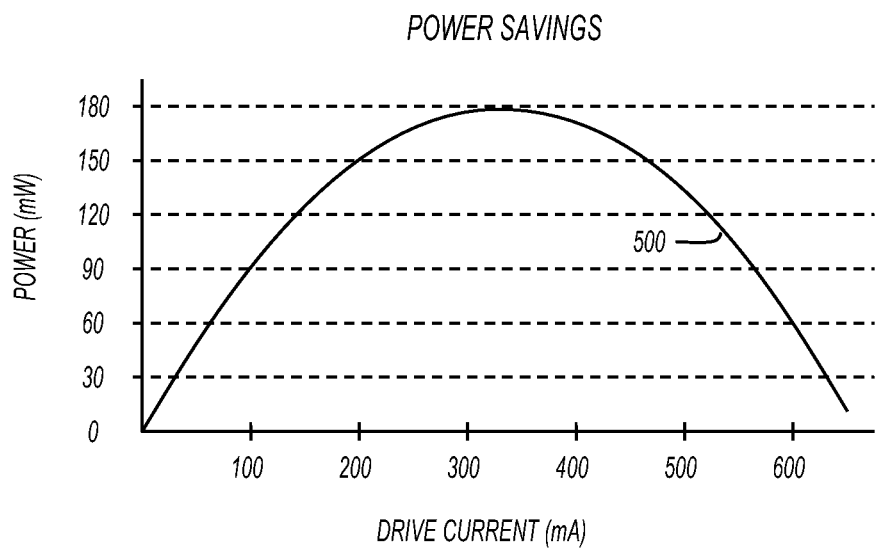
FIG. 5 shows a plot of power savings in accordance with various embodiments of the present invention.

FIG. 5 shows a plot of power savings in accordance with various embodiments of the present invention. Power dissipated in the light source can be expressed as $$P = I_d*VDD = P_d + P_{xs} = I_d*k*I_d + P_{xs} \quad (3)$$

where P is the total power consumed on the laser driver; I is the laser current; Pxs is the power consumed on the equivalent current control resistance and the sampling resistor, which is the only place the power can be saved in the analog laser driver, and k is the slope of the laser I-V curve. Pxs can be expressed as $$P_{xs} = I_d(VDD - k*I_d) = I_d(VDD - V_d) \quad (4)$$

From eq. (4), we can see that the when the light source power supply voltage closely follows the forward voltage drop of the laser diode, less power is consumed on Rxs. Because the laser current $I_d$ varies by video contents and so does $V_d$, making VDD follow changes in the video content will reduce the overhead power loss on the analog current source laser driver.

Assuming that Pxs can be brought to zero (an approximation for illustration purposes), the amount of power savings resulting from a variable VDD can be expressed as $$P_{saved} = (V_{fix} - V_d)*I_d = I_d*V_{fix} - I_d^{2}/600 - 1.5I_d \quad (5)$$

The sample calculation resulting in curve 500 assumes the maximum laser current is designed for 600 mA and the fixed voltage $V_{fix}$ is 2.6V. Curve 500 shows a parabolic relation between drive current and power savings where less power is saved at the extremes. If the laser diode is operated at an average current of 200 mA, the diode voltage drop ($V_d$) at 200 mA is 1.8V. With a fixed light source power supply voltage of 2.6V, the average power is 360 mW plus the overhead power consumption on the serial resistor. If the light source power supply voltage follows the $V_d$ changes perfectly, 150 mW can be saved, or 150/360=41% power savings can be achieved. If the light source power supply voltage does not perfectly follow changes in $V_d$ and a following factor of 75% is assumed, the power savings are 31%.

Figure 6:
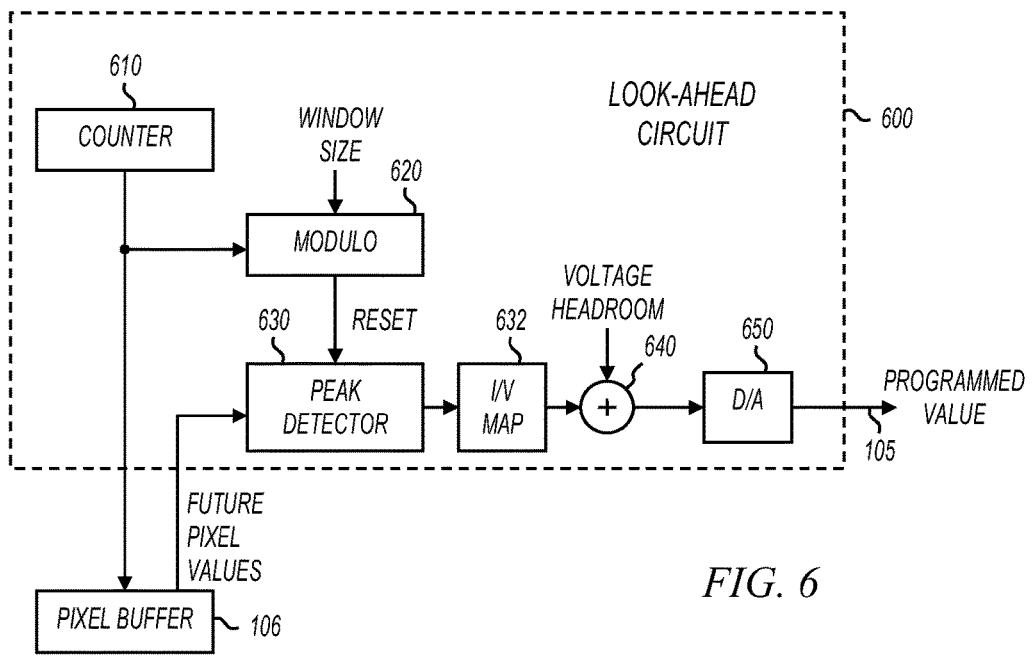
FIG. 6 shows details of a look-ahead circuit in accordance with various embodiments of the present invention.

FIG. 6 shows details of a look-ahead circuit in accordance with various embodiments of the present invention. Look-ahead circuit 600 is an example implementation of look-ahead circuit 104 (FIG. 1). Look-ahead circuit 600 includes counter 610, modulo operator 620, peak detector 630, current-to-voltage mapping circuit 632, summer 640, and digital-to-analog converter 650.

In operation, counter 610 counts up and addresses individual future pixels in pixel buffer 106. In response, pixel buffer 106 provides future pixel values to peak detector 630. Pixel buffer 106 may store pixel values as luminance values, brightness values, drive current values, or any other type of value that can ultimately be mapped to a voltage value for a light source.

Figure 7:
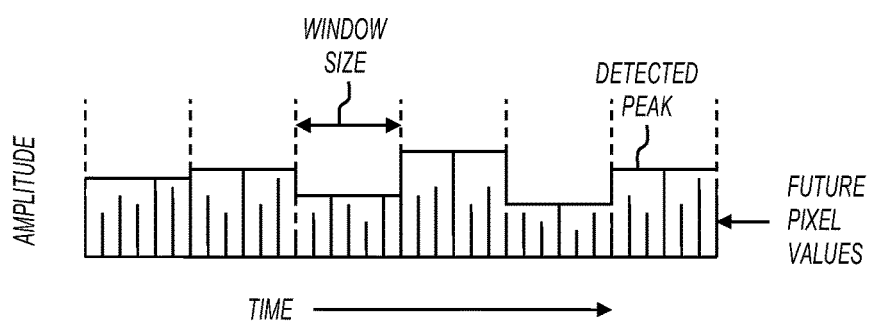
FIG. 7 shows the operation of the look-ahead circuit of FIG. 6.

Peak detector 630 determines the peak future pixel value over a future time period specified by the "window size." The modulo operator resets the peak detector each time the counter value is divisible by the window size. This is shown in FIG. 7, where a new peak is detected for each group of future pixels specified by the window size.

In some embodiments, the window size corresponds to a single line of video. In these embodiments, the programmable voltage source varies once per video line. In other embodiments, the window size is less than a video line. In these embodiments, the programmable voltage source varies multiple times per line. In still further embodiments, the window size is equal to a frame of video. In these embodiments, the programmable voltage source varies once per video frame.

Peak detector 630 provides the peak future pixel value to the current to voltage mapping circuit (I/V MAP) 632. In some embodiments, I/V MAP 632 maps the future pixel values to a laser diode voltage value. For example, referring back to FIG. 4, in some embodiments I/V MAP 632 maps 200 mA to 1.8V. In other embodiments, I/V MAP 632 maps a luminance value or other type of value stored in pixel buffer 106 to a voltage value.

Summer 640 adds a voltage headroom value to the voltage value provided by I/V MAP circuit 632. This corresponds to voltage headroom 240 (FIG. 2) being added to laser diode junction voltage 220 (FIG. 2) to arrive at programmable power supply voltage 121 (FIGS. 1, 2). Digital-to-analog converter 650 converts the output from summer 640 to an analog voltage and provides it to the programmable power supply as programmed value 105.

In some embodiments, I/V MAP 632 maps the contents of pixel buffer 106 directly to a programmed value, and summer 640 is omitted. In other embodiments, pixel buffer 106 includes programmed power supply values along with future pixel values, and peak detector 630 finds peak programmed values directly. In these embodiments, I/V MAP 632 and summer 640 may be omitted.

Look-ahead circuit 600 may be implemented in any suitable manner. For example, in some embodiments, look-ahead circuit 600 is implemented in an application specific integrated circuit (ASIC) that includes digital counters, comparators, adders, and the like. Also for example, in some embodiments, look-ahead circuit 600 is implemented in a mixed-signal ASIC that includes digital circuitry as well as digital-to-analog converter 650.

FIG. 7 shows the operation of the look-ahead circuit of FIG. 6. As shown in FIG. 7, peak pixel values are found for future time periods. The length of the time periods is variable as specified by the window size. The number of pixels to be grouped in each time period may depend on many factors, including on how fast the programmable power supply can be modulated and how much switching noise the system can tolerate. Because the laser current is controlled and regulated by the analog current source, any voltage ripple present on the power supply output may not necessarily be coupled to the laser output. Accordingly, in some embodiments, power supply voltage ripple specifications may be relaxed. For example, if a video line is grouped as one window, the power supply will be modulated at about 20 kHz. If the power supply can be modulated at 200 kHz (because of relaxed voltage ripple specs), a video line can be grouped in 10 separate time periods.

Figure 8:
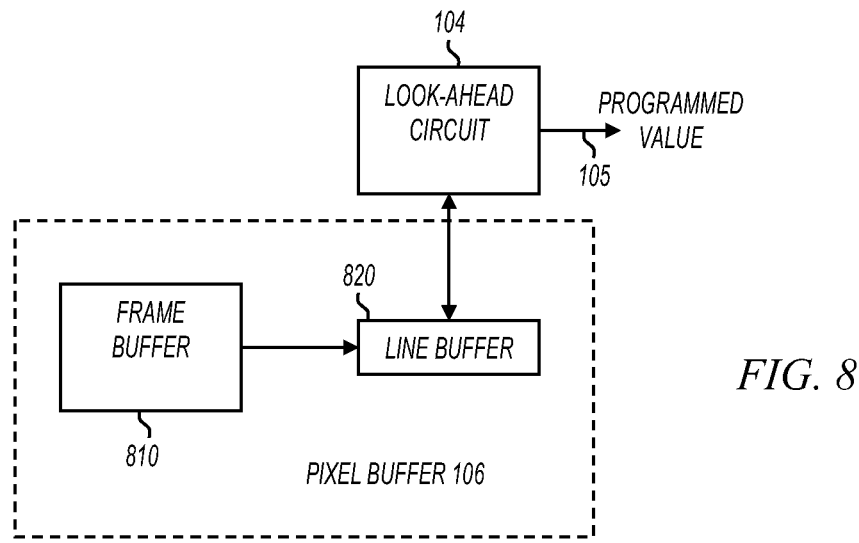
FIG. 8 shows a look-ahead circuit communicating with a line buffer in accordance with various embodiments of the present invention.

FIG. 8 shows a look-ahead circuit communicating with a line buffer in accordance with various embodiments of the present invention. In embodiments represented by FIG. 8, pixel buffer 106 includes a frame buffer and a line buffer. Frame buffer 810 holds one or more video frames of future pixel data. Line buffer 820 holds one or more lines of future pixel data. In operation, video processing circuit 102 (FIG. 1) processes incoming video and fill frame buffer 810 with pixel data for future frames, and line buffer 820 is periodically loaded with lines of pixel data from frame buffer 810.

In embodiments represented by FIG. 8, look-ahead circuit 104 receives future pixel data from line buffer 820 and determines a programmed value for the power supply to apply in the future. In some embodiments, the programmed value is changed once per video line, and in other embodiments, the programmed value is changed multiple times per video line.

Figure 9:
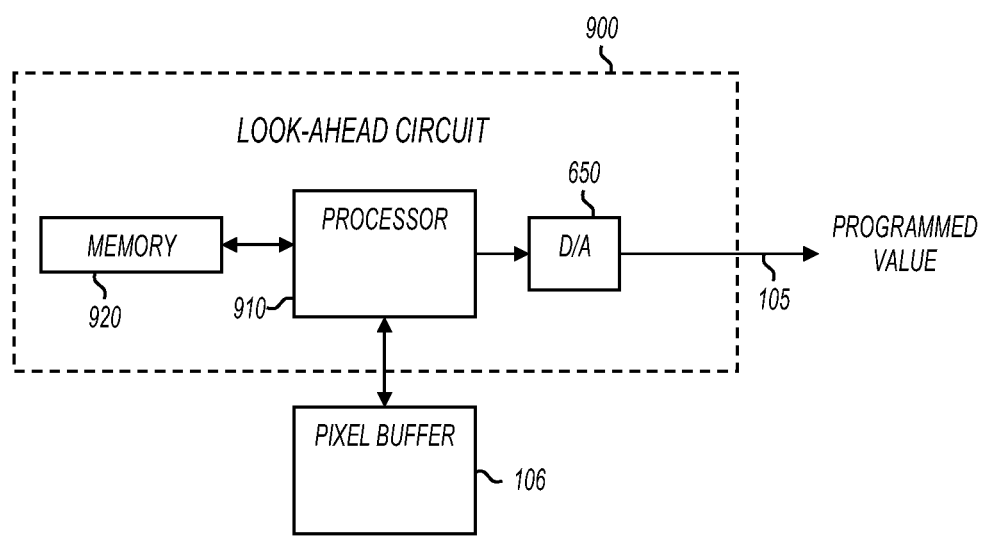
FIG. 9 shows a look-ahead circuit that includes a processor in accordance with various embodiments of the present invention.

FIG. 9 shows a look-ahead circuit that includes a processor in accordance with various embodiments of the present invention. Look-ahead circuit 900 is an example implementation of look-ahead circuit 104 (FIG. 1). Look-ahead circuit 900 includes processor 910, memory 920, and digital-to-analog converter 650.

Processor 910 may be any type of finite state machine capable of performing actions based on the state of memory 920. For example, processor 910 may include digital circuits including multipliers, adders, counters, accumulators, registers, multiplexers, decoders, and the like. In some embodiments, processor 910 is part of a custom ASIC designed specifically for look-ahead operations as described herein. In other embodiments, processor 910 is a commercially available processor such as a microprocessor, digital signal processor, microcontroller, or the like.

Memory 920 is an electronic device capable of storing state information. For example, memory 920 may include an array of storage elements composed of floating gate transistors, interconnected by metal layers of an integrated circuit. Each of the storage elements may store state information by varying the amount of electrical charge on the floating gates. Also for example, memory 920 may include an array of static random access memory cells composed of transistors manufactured using a complementary metal oxide semiconductor (CMOS) process. In these embodiments, state information may be stored using many different mechanisms, including trapping stored charge on various transistor nodes or capacitive elements.

In operation, processor 910 senses stored state information within memory 920, and performs sequential actions in response thereto. For example, processor 910 may request future pixel drive values from pixel buffer 106, detect peak values, and determine programmed values for a laser light source power supply voltage. In some embodiments, processor 910 detects one peak value per line of video data stored in pixel buffer 106, and in other embodiments, processor 910 detects more than one peak value per line of video data stored in pixel buffer 106.

Figure 10:
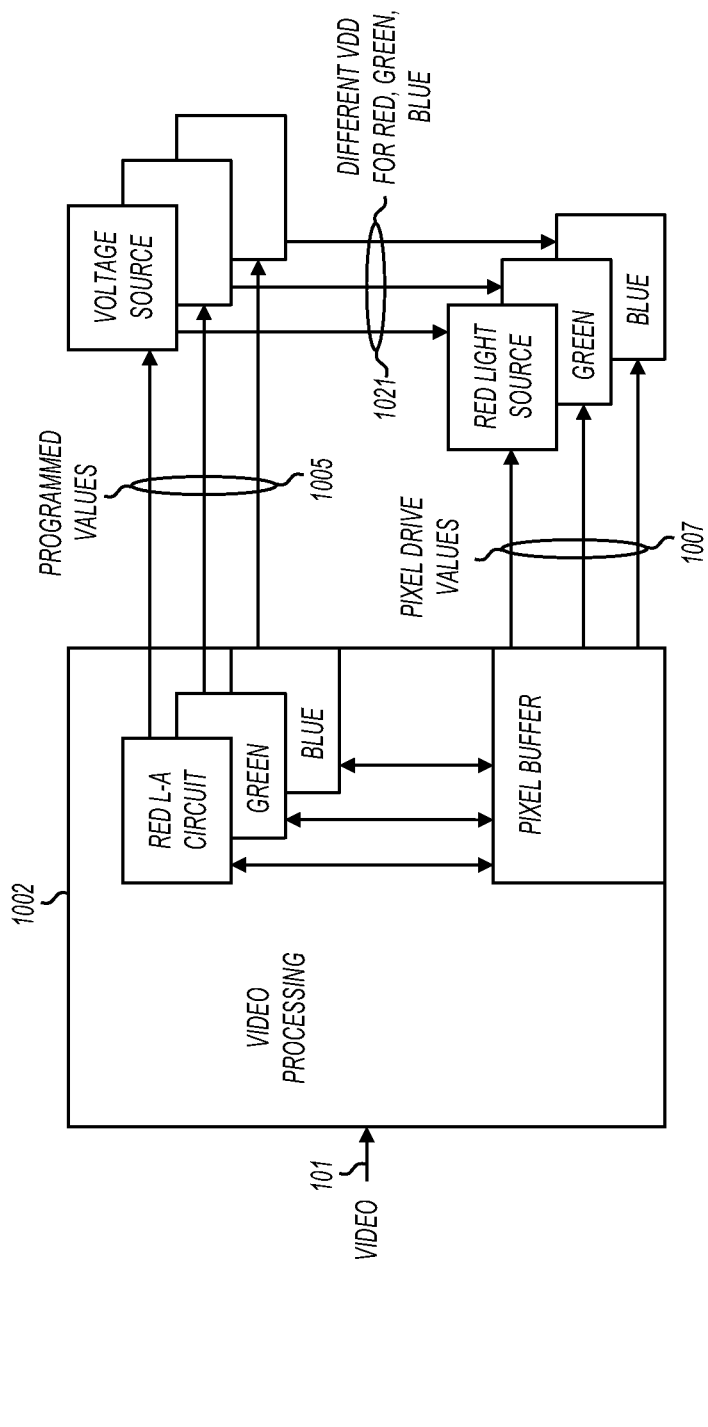
FIG. 10 shows a portion of a scanning laser projector with multiple look-ahead circuits in accordance with various embodiments of the present invention.

FIG. 10 shows a portion of a scanning laser projector with multiple look-ahead circuits in accordance with various embodiments of the present invention. Embodiments represented by FIG. 10 include three separate laser light sources: one each for red, green, and blue. Three separate programmable voltage sources are also included: one for each of the three light sources. Video processing circuit 1002 includes separate look-ahead circuits for each color. The red look-ahead (RED L-A) circuit looks at future pixel data for the red light source, the blue look-ahead circuit looks at future pixel data for the blue light source, and the green look-ahead circuit looks at future pixel data for the green light source.

Each of the look-ahead circuits provides programmed values to the programmable voltage sources at 1005, and then each programmable voltage source provides a different voltage to the light sources at 1021. The voltages at 1021 are timed to correspond to the pixel drive values at 1007 from which they were derived.

Figure 11:
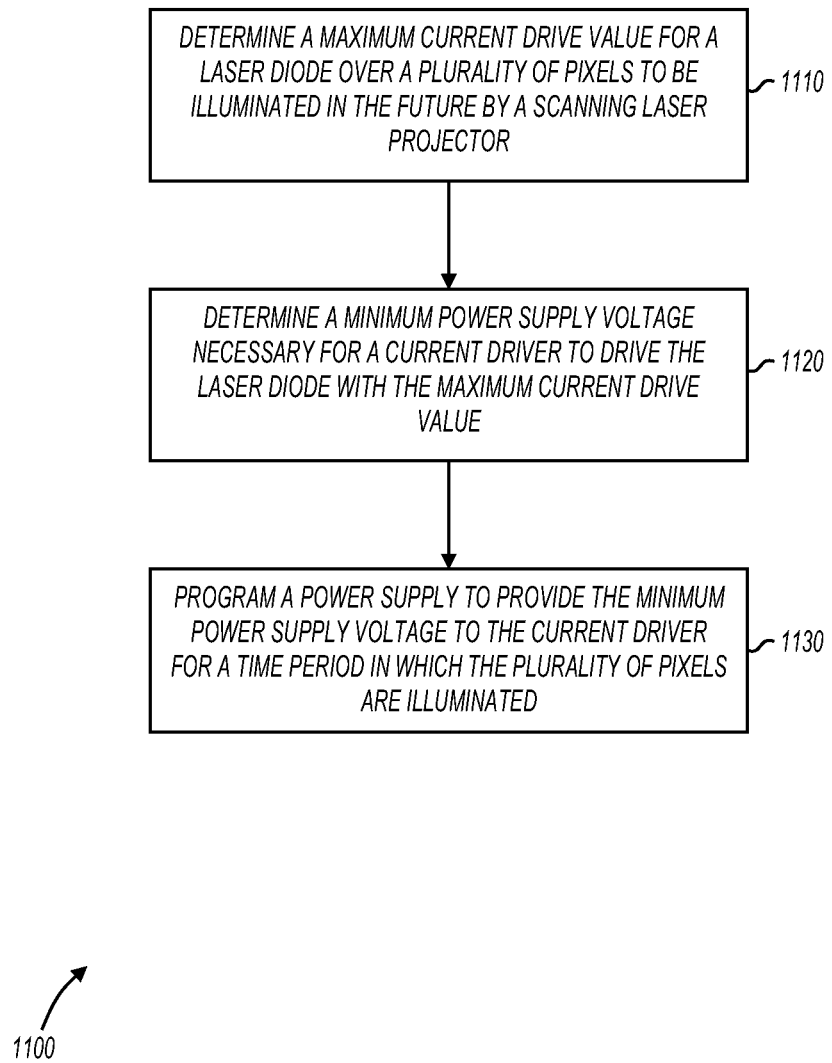
FIG. 11 shows a flowchart of methods in accordance with various embodiments of the present invention.

FIG. 11 shows a flow diagram of methods in accordance with various embodiments of the present invention. In some embodiments, method 1100, or portions thereof, is performed by a scanning laser projector, embodiments of which are shown in previous figures. In other embodiments, method 1100 is performed by a series of circuits or an electronic system. Method 1100 is not limited by the particular type of apparatus performing the method. Further, in some embodiments, some actions listed in FIG. 11 are omitted from method 1100.

Method 1100 is shown beginning with block 1110 in which a maximum current drive value for a laser diode over a plurality of pixels to be illuminated in the future by a scanning laser projector is determined. In some embodiments, this corresponds to operation of a look-ahead circuit such as look-ahead circuit 104 (FIG. 1), look-ahead circuit 600 (FIG. 6), or look-ahead circuit 900 (FIG. 9). The current drive values are stored in a pixel buffer such as pixel buffer 106 (FIG. 1).

In some embodiments, the plurality of pixels to be illuminated in the future correspond to a video line of pixels, and in other embodiments, the plurality of pixels to be illuminated in the future corresponds to less than a video line of pixels. In still further embodiments, the plurality of pixels to be illuminated in the future corresponds to a frame of video data. The number of the plurality of pixels to be illuminated in the future may be specified by a window size as shown in FIGS. 6 and 7.

In some embodiments, the laser diode current drive values are stored directly in the pixel buffer, and the look-ahead circuit reads current drive values from the pixel buffer. In other embodiments, luminance values are stored in the pixel buffer and the look-ahead circuit reads luminance values and then maps them to laser diode current drive values.

At 1120, a minimum power supply voltage necessary for a current driver to drive the laser diode with the maximum current drive value found in 1110 is determined. In some embodiments, this corresponds to mapping a laser diode current to a diode voltage plus a voltage headroom value. This may be accomplished with a single mapping operation, or may be accomplished by first mapping the laser diode current to a diode voltage and then summing a voltage headroom value to allow proper operation of an analog current driver.

At 1130, a power supply is programmed to provide the power supply voltage found in 1120. The application of the power supply voltage is timed to coincide with the time period in which the plurality of pixels are illuminated. This corresponds to a look-ahead circuit providing a programmed value to a programmable power supply such as programmable voltage source 120 (FIG. 1).

Figure 12:
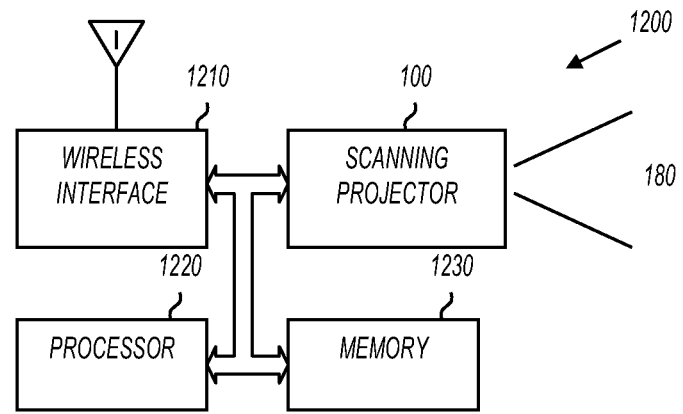
FIG. 12 shows a block diagram of a mobile device in accordance with various embodiments of the present invention.

FIG. 12 shows a block diagram of a mobile device in accordance with various embodiments of the present invention. As shown in FIG. 12, mobile device 1200 includes wireless interface 1210, processor 1220, memory 1230, and scanning projector 100. Scanning projector 100 paints a raster image at 180. Scanning projector 100 is a scanning laser projector as described above with reference to previous figures. For example, scanning projector 100 may include look-ahead circuit(s) and programmable voltage source(s) as described above.

Scanning projector 100 may receive image data from any image source. For example, in some embodiments, scanning projector 100 includes memory that holds still images. In other embodiments, scanning projector 100 includes memory that includes video images. In still further embodiments, scanning projector 100 displays imagery received from external sources such as connectors, wireless interface 1210, a wired interface, or the like.

Wireless interface 1210 may include any wireless transmission and/or reception capabilities. For example, in some embodiments, wireless interface 1210 includes a network interface card (NIC) capable of communicating over a wireless network. Also for example, in some embodiments, wireless interface 1210 may include cellular telephone capabilities. In still further embodiments, wireless interface 1210 may include a global positioning system (GPS) receiver. One skilled in the art will understand that wireless interface 1210 may include any type of wireless communications capability without departing from the scope of the present invention.

Processor 1220 may be any type of processor capable of communicating with the various components in mobile device 1200. For example, processor 1220 may be an embedded processor available from application specific integrated circuit (ASIC) vendors, or may be a commercially available microprocessor. In some embodiments, processor 1220 provides image or video data to scanning projector 100. The image or video data may be retrieved from wireless interface 1210 or may be derived from data retrieved from wireless interface 1210. For example, through processor 1220, scanning projector 100 may display images or video received directly from wireless interface 1210. Also for example, processor 1220 may provide overlays to add to images and/or video received from wireless interface 1210, or may alter stored imagery based on data received from wireless interface 1210 (e.g., modifying a map display in GPS embodiments in which wireless interface 1210 provides location coordinates).

Figure 13:
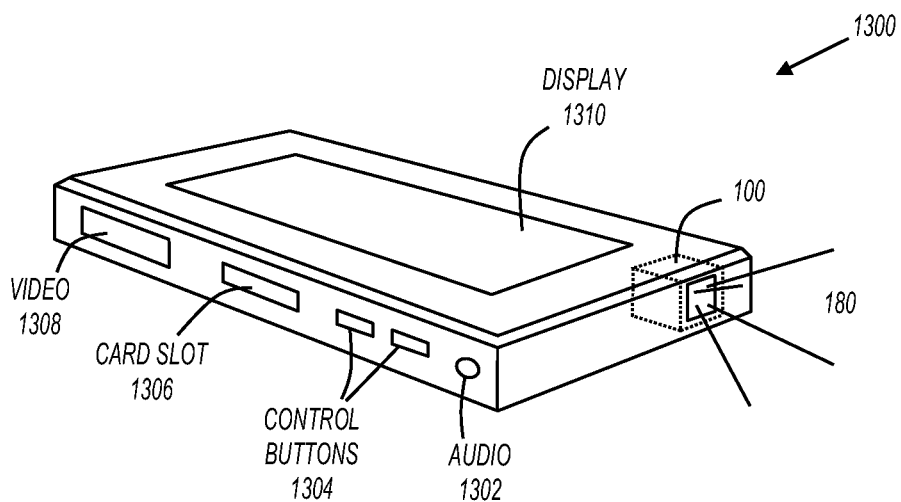
FIG. 13 shows a mobile device in accordance with various embodiments of the present invention.

FIG. 13 shows a mobile device in accordance with various embodiments of the present invention. Mobile device 1300 may be a hand held projection device with or without communications ability. For example, in some embodiments, mobile device 1300 may be a handheld projector with little or no other capabilities. Also for example, in some embodiments, mobile device 1300 may be a device usable for communications, including for example, a cellular phone, a smart phone, a table computer, a global positioning system (GPS) receiver, or the like. Further, mobile device 1300 may be connected to a larger network via a wireless (e.g., cellular) connection, or this device can accept data messages or video content via an unregulated spectrum (e.g., WiFi) connection.

Mobile device 1300 includes scanning projector 100 to create an image with light at 180. Mobile device 1300 also includes many other types of circuitry; however, they are intentionally omitted from FIG. 13 for clarity.

Mobile device 1300 includes display 1310, audio port 1302, control buttons 1304, card slot 1306, and audio/video (A/V) port 1308. None of these elements are essential. For example, mobile device 1300 may only include scanning projector 100 without any of display 1310, audio port 1302, control buttons 1304, card slot 1306, or A/V port 1308. Some embodiments include a subset of these elements. For example, an accessory projector product may include scanning projector 100, control buttons 1304 and A/V port 1308.

Display 1310 may be any type of display. For example, in some embodiments, display 1310 includes a liquid crystal display (LCD) screen. Display 1310 may be a touch sensitive display so that it may also be used as an input device. Display 1310 may always display the same content projected at 180 or different content. For example, an accessory projector product may always display the same content, whereas a mobile phone embodiment may project one type of content at 180 while displaying different content on display 1310.

A/V port 1308 accepts and/or transmits video and/or audio signals. For example, A/V port 1308 may be a digital port, such as a high definition multimedia interface (HDMI) interface, that accepts a cable suitable to carry digital audio and video data. Further, A/V port 1308 may include RCA jacks to accept composite inputs. Still further, A/V port 1308 may include a VGA connector to accept analog video signals. In some embodiments, mobile device 1300 may be tethered to an external signal source through A/V port 1308, and mobile device 1300 may project content accepted through A/V port 1308. In other embodiments, mobile device 1300 may be an originator of content, and A/V port 1308 is used to transmit content to a different device.

Audio port 1302 provides audio signals. For example, in some embodiments, mobile device 1300 is a media player that can store and play audio and video. In these embodiments, the video may be projected at 180 and the audio may be output at audio port 1302. In other embodiments, mobile device 1300 may be an accessory projector that receives audio and video at A/V port 1308. In these embodiments, mobile device 1300 may project the video content at 180, and output the audio content at audio port 1302.

Mobile device 1300 also includes card slot 1306. In some embodiments, a memory card inserted in card slot 1306 may provide a source for audio to be output at audio port 1302 and/or video data to be projected at 180. Card slot 1306 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Control buttons 1304 may be used for any purpose. For example, in some embodiments, control buttons 1304 may be used to navigate a menu system on display 1310.

Figure 14:
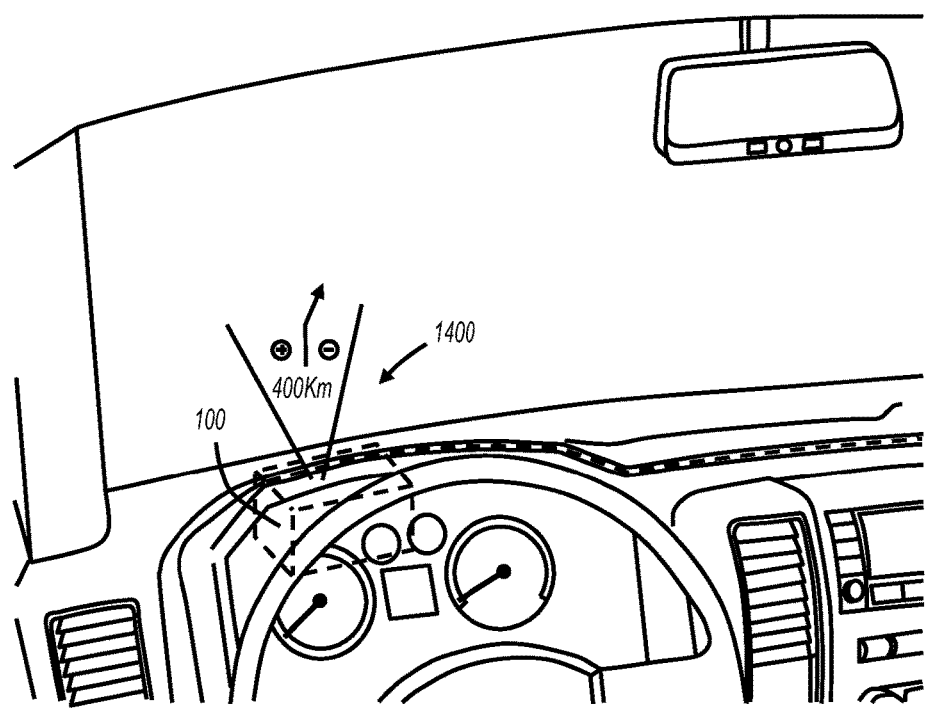
FIG. 14 shows a head-up display system in accordance with various embodiments of the invention.

FIG. 14 shows a head-up display system in accordance with various embodiments of the invention. Projector 100 is shown mounted in a vehicle dash to project the head-up display at 1400. Although an automotive head-up display is shown in FIG. 14, this is not a limitation of the present invention. For example, various embodiments of the invention include head-up displays in avionics application, air traffic control applications, and other applications.

Figure 15:
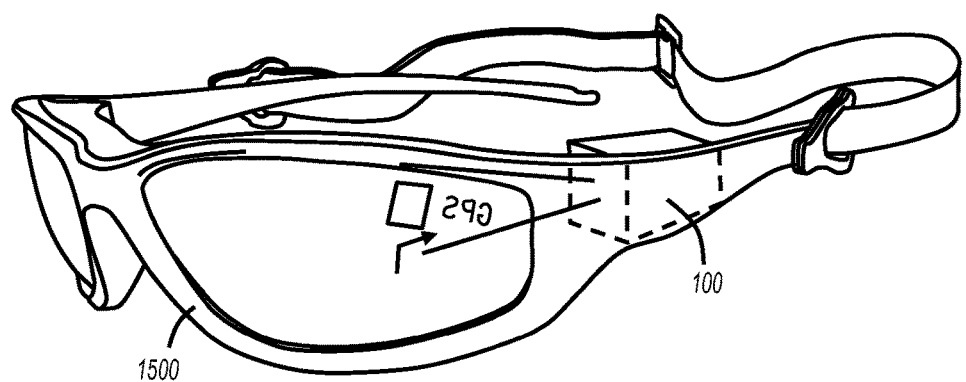
FIG. 15 shows eyewear in accordance with various embodiments of the invention.

FIG. 15 shows eyewear in accordance with various embodiments of the invention. Eyewear 1500 includes projector 100 to project a display in the eyewear's field of view. In some embodiments, eyewear 1500 is see-through and in other embodiments, eyewear 1500 is opaque. For example, eyewear 1500 may be used in an augmented reality application in which a wearer can see the display from projector 100 overlaid on the physical world. Also for example, eyewear 1500 may be used in a virtual reality application, in which a wearer's entire view is generated by projector 100. Although only one projector 100 is shown in FIG. 15, this is not a limitation of the present invention. For example, in some embodiments, eyewear 1500 includes two projectors; one for each eye.

Figure 16:
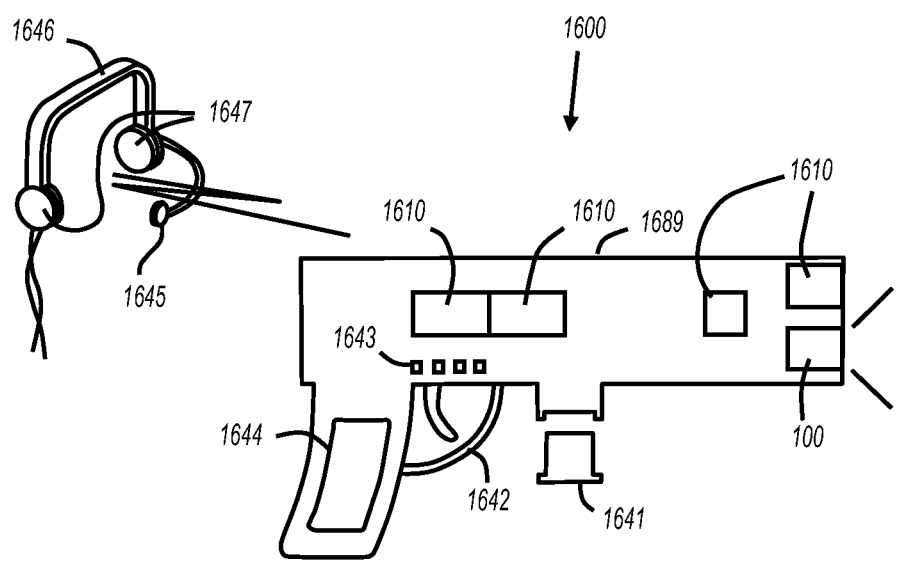
FIG. 16 shows a gaming apparatus in accordance with various embodiments of the present invention.

FIG. 16 shows a gaming apparatus in accordance with various embodiments of the present invention. Gaming apparatus 1600 allows a user or users to observe and interact with a gaming environment. In some embodiments, the game is navigated based on the motion, position or orientation of gaming apparatus 1600, an apparatus that includes scanning laser projector 100. Other control interfaces, such as manually-operated buttons, foot pedals, or verbal commands, may also contribute to navigation around, or interaction with the gaming environment. For example, in some embodiments, trigger 1642 contributes to the illusion that the user or users are in a first person perspective video game environment, commonly known as a "first person shooter game." Because the size and brightness of the projected display can be controlled by the gaming application in combination with the user's movement, gaming apparatus 1600 creates a highly believable or "immersive" environment for these users.

Many other first person perspective simulations can also be created by gaming apparatus 1600, for such activities as 3D seismic geo-prospecting, spacewalk planning, jungle canopy exploration, automobile safety instruction, medical education, etc. Tactile interface 1644 may provide a variety of output signals, such as recoil, vibration, shake, rumble, etc. Tactile interface 1644 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1600 may also include audio output devices, such as integrated audio speakers, remote speakers, or headphones. These sorts of audio output devices may be connected to gaming apparatus 1600 with wires or through a wireless technology. For example, wireless headphones 1646 provide the user with sound effects via a Bluetooth connection, although any sort of similar wireless technology could be substituted freely. In some embodiments, wireless headphones 1646 may include microphone 1645 or binaural microphone 1647, to allow multiple users, instructors, or observers to communicate. Binaural microphone 1647 typically includes microphones on each ear piece, to capture sounds modified by the user's head shadow. This feature may be used for binaural hearing and sound localization by other simulation participants.

Gaming apparatus 1600 may include any number of sensors 1610 that measure distance, ambient brightness, motion, position, orientation, and the like. For example, gaming apparatus 1600 may detect absolute heading with a digital compass, and detect relative motion with an x-y-z gyroscope or accelerometer. In some embodiments, gaming apparatus 1600 also includes a second accelerometer or gyroscope to detect the relative orientation of the device, or its rapid acceleration or deceleration. In other embodiments, gaming apparatus 1600 may include a Global Positioning Satellite (GPS) sensor, to detect absolute position as the user travels in terrestrial space.

Gaming apparatus 1600 may include battery 1641 and/or diagnostic lights 1643. For example, battery 1641 may be a rechargeable battery, and diagnostic lights 1643 could indicate the current charge of the battery. In another example, battery 1641 may be a removable battery clip, and gaming apparatus 1600 may have an additional battery, electrical capacitor or super-capacitor to allow for continued operation of the apparatus while the discharged battery is replaced with a charged battery. In other embodiments, diagnostic lights 1643 can inform the user or a service technician about the status of the electronic components included within or connected to this device. For example, diagnostic lights 1643 may indicate the strength of a received wireless signal, or the presence or absence of a memory card. Diagnostic lights 1643 could also be replaced by any small screen, such as an organic light emitting diode or liquid crystal display screen. Such lights or screens could be on the exterior surface of gaming apparatus 1600, or below the surface, if the shell for this apparatus is translucent or transparent.

Other components of gaming apparatus 1600 may be removable, detachable or separable from this device. For example, the scanning laser projector may be detachable or separable from gaming housing 1649. In some embodiments, the subcomponents of the scanning laser projector may be detachable or separable from gaming housing 1649, and still function.

Although the present invention has been described in conjunction with certain embodiments, it is to be understood that modifications and variations may be resorted to without departing from the scope of the invention as those skilled in the art readily understand. It is to be clearly understood that the above description is made only by way of example, and not as a limitation on the scope of the invention.

What is claimed is:

1. A scanning laser projector comprising:
a scanning mirror to reflect a modulated light beam;
a laser diode to produce the modulated light beam when driven with a drive current, the laser diode having a junction voltage when driven with the drive current;
a current driver coupled to drive the laser diode with the drive current, the current driver including a power supply input and a pixel drive input;
a programmable power supply coupled to provide the current driver with a programmable voltage at the power supply input; and
a video processing apparatus to receive video data and to drive the current driver at the pixel drive input to illuminate pixels, wherein the video processing apparatus includes a pixel buffer to store future drive values for pixels to be illuminated in the future, and a look-ahead circuit that includes a peak detector to detect a peak future drive value in at least a portion of the pixel buffer, and where the look-ahead circuit determines future programmable voltages in response to the future drive values stored in the pixel buffer such that the future programmable voltages follow future changes in the junction voltage resulting from the future drive values stored in the pixel buffer plus a voltage headroom value.

2. The scanning laser projector of claim 1 wherein the look-ahead circuit determines one future programmable voltage per frame of video data.

3. The scanning laser projector of claim 1 wherein the look-ahead circuit determines one future programmable voltage per line of video data.

4. The scanning laser projector of claim 1 wherein the look-ahead circuit determines multiple future programmable voltages per line of video data.

5. The scanning laser projector of claim 1 wherein the programmable power supply comprises a switching power supply.

6. The scanning laser projector of claim 1 wherein the laser diode comprises an anode and a cathode, and wherein the power supply input of the current driver is coupled to the anode of the laser diode.

7. The scanning laser projector of claim 6 wherein the current driver comprises an amplifier having an amplifier input and an amplifier output, and wherein the pixel drive input of the current driver is coupled to the amplifier input.

8. The scanning laser projector of claim 7 wherein the current driver further comprises a drive transistor, and wherein the amplifier output is coupled to the drive transistor, and wherein the drive transistor is further coupled to the cathode of the laser diode.

9. The scanning laser projector of claim 1 wherein the look-ahead circuit further comprises a voltage mapping circuit to map the detected peak future drive value to a voltage value of the laser diode.

10. The scanning laser projector of claim 9 wherein the look-ahead circuit further comprises a summer to add the voltage headroom value to the voltage value of the laser diode.

11. A scanning laser projector comprising:
a scanning mirror to reflect a modulated light beam;
a laser diode to produce the modulated light beam when driven with a drive current, the laser diode including an anode and a cathode, the laser diode having a junction voltage when driven with the drive current;
a current driver coupled to drive the laser diode with the drive current, the current driver including a pixel drive input, an amplifier, and a power supply input, the pixel drive input coupled to the amplifier;
a programmable power supply coupled to the power supply input to provide the current driver with a programmable voltage at the power supply input; and
a video processing apparatus to receive video data and to drive the current driver at the pixel drive input to illuminate pixels, wherein the video processing apparatus includes a pixel buffer to store future drive values for pixels to be illuminated in the future, and a look-ahead circuit that includes a peak detector to detect a peak future drive value in at least a portion of the pixel buffer, and where the look-ahead circuit determines future programmable voltages in response to the future drive values stored in the pixel buffer such that the future programmable voltages follow changes in the junction voltage resulting from the future drive values stored in the pixel buffer plus a voltage headroom value.

12. A scanning laser projector comprising:
a scanning mirror to reflect a modulated light beam;
a laser diode to produce the modulated light beam when driven with a drive current, the laser diode including an anode and a cathode, the laser diode having a junction voltage when driven with the drive current;
a current driver coupled to drive the laser diode with the drive current, the current driver including a pixel drive input, an amplifier, and a power supply input coupled to the anode, the pixel drive input coupled to the amplifier;
a programmable power supply coupled to the power supply input to provide the current driver with a programmable voltage at the power supply input; and
a video processing apparatus to receive video data and to drive the current driver at the pixel drive input to illuminate pixels, wherein the video processing apparatus includes a pixel buffer to store future drive values for pixels to be illuminated in the future, and wherein the video processing apparatus further includes a look-ahead circuit that includes a peak detector to detect a peak future drive value in at least a portion of the pixel buffer and a voltage mapping circuit to map the detected peak future drive value to a voltage value of the laser diode, and where the look-ahead circuit determines future programmable voltages in response to the detected peak future drive value and the mapped voltage value of the laser diode such that the programmable voltages follow changes in the junction voltage resulting from the future drive values stored in the pixel buffer plus a voltage headroom value.

* * * * *